(12) United States Patent
Mizutani et al.

(10) Patent No.: US 7,912,952 B2
(45) Date of Patent: Mar. 22, 2011

(54) CONTENT UTILIZATION MANAGEMENT METHOD CORRESPONDING TO NETWORK TRANSFER, PROGRAM, AND CONTENT TRANSFER SYSTEM

(75) Inventors: Mika Mizutani, Tokyo (JP); Harumi Morino, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1017 days.

(21) Appl. No.: 10/847,665

(22) Filed: May 18, 2004

(65) Prior Publication Data
US 2005/0228858 A1 Oct. 13, 2005

(30) Foreign Application Priority Data
Mar. 25, 2004 (JP) ................................. 2004-088295

(51) Int. Cl.
G06F 15/173 (2006.01)
G06F 15/16 (2006.01)
H04L 9/00 (2006.01)
(52) U.S. Cl. .......................... 709/225; 709/227; 380/277
(58) Field of Classification Search .......... 709/223–225; 705/2; 700/10, 20; 713/170
See application file for complete search history.

(56) References Cited

U.S. PATENT DOCUMENTS

| | | | | |
|---|---|---|---|---|
| 5,822,493 A | * | 10/1998 | Uehara et al. | 386/109 |
| 6,356,903 B1 | * | 3/2002 | Baxter et al. | 707/10 |
| 6,571,309 B2 | * | 5/2003 | Ando et al. | 711/4 |
| 6,643,663 B1 | * | 11/2003 | Dabney et al. | 707/102 |
| 7,222,185 B1 | * | 5/2007 | Day | 709/232 |
| 7,292,781 B1 | * | 11/2007 | Ito et al. | 386/96 |
| 2001/0025311 A1 | * | 9/2001 | Arai et al. | 709/225 |
| 2002/0003883 A1 | * | 1/2002 | Noda et al. | 380/232 |
| 2002/0087347 A1 | * | 7/2002 | Mano et al. | 705/1 |
| 2002/0108037 A1 | * | 8/2002 | Baker | 713/168 |

(Continued)

FOREIGN PATENT DOCUMENTS

JP 2002-329027 11/2002

(Continued)

OTHER PUBLICATIONS

U.S. Appl. No. 10/847,664, filed May 18, 2004, Morimoto et al.

(Continued)

*Primary Examiner* — Jeffrey Pwu
*Assistant Examiner* — Guang Li
(74) *Attorney, Agent, or Firm* — McDermott Will & Emery LLP

(57) ABSTRACT

A system estimates accessibility on the basis of information of a requesting device and digital rights management information of content when a utilization request of the content is raised through a network. In a device including a hard disk for storing a plurality of content files and having a networking function for transmitting the content file to other device, a utilization condition and a utilization state are so managed as to correspond to the content file and when a utilization request of a content file is made, utilizability of the content file is judged from a utilization object in the utilization request and from information of a transmitting device of the utilization request. When utilization is not judged as possible, a report is made to the transmitting device of the utilization request to the effect that the content file cannot be utilized.

5 Claims, 10 Drawing Sheets

U.S. PATENT DOCUMENTS

| | | | |
|---|---|---|---|
| 2002/0152381 A1* | 10/2002 | Kuriya et al. | 713/170 |
| 2002/0161911 A1* | 10/2002 | Pinckney et al. | 709/231 |
| 2002/0178271 A1* | 11/2002 | Graham et al. | 709/229 |
| 2003/0069803 A1* | 4/2003 | Pollitt | 705/26 |
| 2003/0108340 A1 | 6/2003 | Yamashita et al. | |
| 2004/0015730 A1 | 1/2004 | Arai et al. | |
| 2004/0117500 A1* | 6/2004 | Lindholm et al. | 709/231 |
| 2004/0163123 A1* | 8/2004 | Okada et al. | 725/116 |
| 2004/0205333 A1* | 10/2004 | Bjorkengren | 713/153 |

FOREIGN PATENT DOCUMENTS

| | | |
|---|---|---|
| JP | 2003-273861 | 6/2003 |
| JP | 2004-005315 | 1/2004 |

OTHER PUBLICATIONS

Japanese Office Action issued in Japanese Patent Application No. JP 2004-088295, dated Mar. 10, 2009.

* cited by examiner

FIG.4

400 CONTENT MANAGEMENT INFORMATION

| | | |
|---|---|---|
| 401 | CONTENT IDENTIFIER | file-name1 |
| 402 | TITLE NAME | HISTORY OF HITACHI, LTD. |
| 403 | TYPE | MPEG2-TS |
| 404 | path TO CONTENT | /content/file-name1 |
| 405 | path TO METADATA | /metainfo/file-name1/seek |
| 406 | ACCESS LEVEL | ANY |
| 407 | DIGITAL RIGHTS MANAGEMENT DOMAIN | ARIB |
| 408 | DIGITAL RIGHTS MANAGEMENT INFORMATION (LICENSE, ETC) | LOCAL CIPHER : DES : /metainfo/file-name1/LC<br>CIPHER : /cipher<br>USAGE LIMITATION : 2months<br>COPY CONTROL INFORMATION: COPY ONCE<br>NUMBER OF SIMULTANEOUS UTILIZATION : None<br>WATCHING FREQUENCY : None |
| 409 | CONTENT UTILIZATION STATE | IN-PLAY : 1<br>IN-COPY : 0<br>IN-MOVEMENT : 0<br>UTILIZATION FREQUENCY.: 2 |

FIG.5

| | LIBRARY | SUMMARY |
|---|---|---|
| 603 | setup | TO PREPARE FOR START OF CONTENT PLAY, CONTENT TO BE PLAYED IS DESIGNATED. CONTENT INFORMATION (IDENTIFIER, LOCATION (INCLUDING LOCATION INFORMATION ON NETWORK), ETC) IS NECESSARY. TO CONTROL CONTENT AFTER PLAYING, IDENTIFIER CORRESPONDING TO PLAYING STREAM IS REPORTED TO AP. |
| | play | CONTENT PLAYING IS STARTED AGAIN. RE-STARTING STREAM IS DESIGNATED BY IDENTIFIER. |
| | stop | CONTENT PLAYING IS STOPPED. STREAM STOPPED IS DESIGNATED BY IDENTIFIER. |
| | pause | CONTENT PLAYING IS STOPPED TEMPORARILY. STREAM STOPPED TEMPORARILY IS DESIGNATED BY IDENTIFIER. |
| | forward | FORWARDING IS MADE DURING CONTENT PLAYING. STREAM FOR FORWARDING IS DESIGNATED BY IDENTIFIER. FORWARDING STEEP IS DESIGNATED. |
| | rewind | REWINDING IS MADE DURING CONTENT PLAYING. STREAM FOR REWINDING IS DESIGNATED BY IDENTIFIER. REWINDING SPEED IS DESIGNATED. |
| | terminate | CONTENT PLAYING IS TERMINATED. STREAM FOR TERMINATION IS DESIGNATED BY IDENTIFIER. |
| 614A | record | RECORDING OF CONTENT IN PLAYING IS MADE DURING CONTENT PLAYING. STREAM FOR RECORDING IS DESIGNATED BY IDENTIFIER. WHEN RECORDING CANNOT BE MADE DUE TO STATE OF DIGITAL RIGHTS MANAGEMENT NECESSARY FOR CONTENT, FAILURE OF RECORDING IS REPORTED AS ERROR TO AP. |
| 601A | refer | CONTENT INFORMATION (NAME, IDENTIFIER, LOCATION, ATTRIBUTE) IS STORED AS CONTENT LIST. ADDRESS OF MEMORY AREA IS REPORTED TO AP. DESIGNATION OF REFERENCE DESTINATION INFORMATION (OWN AV EQUIPMENT, HOME EQUIPMENT, EXTERNAL EQUIPMENT) IS NECESSARY FOR IDENTIFYING STORAGE DESTINATION OF CONTENT LIST TO BE REFERRED. |

201

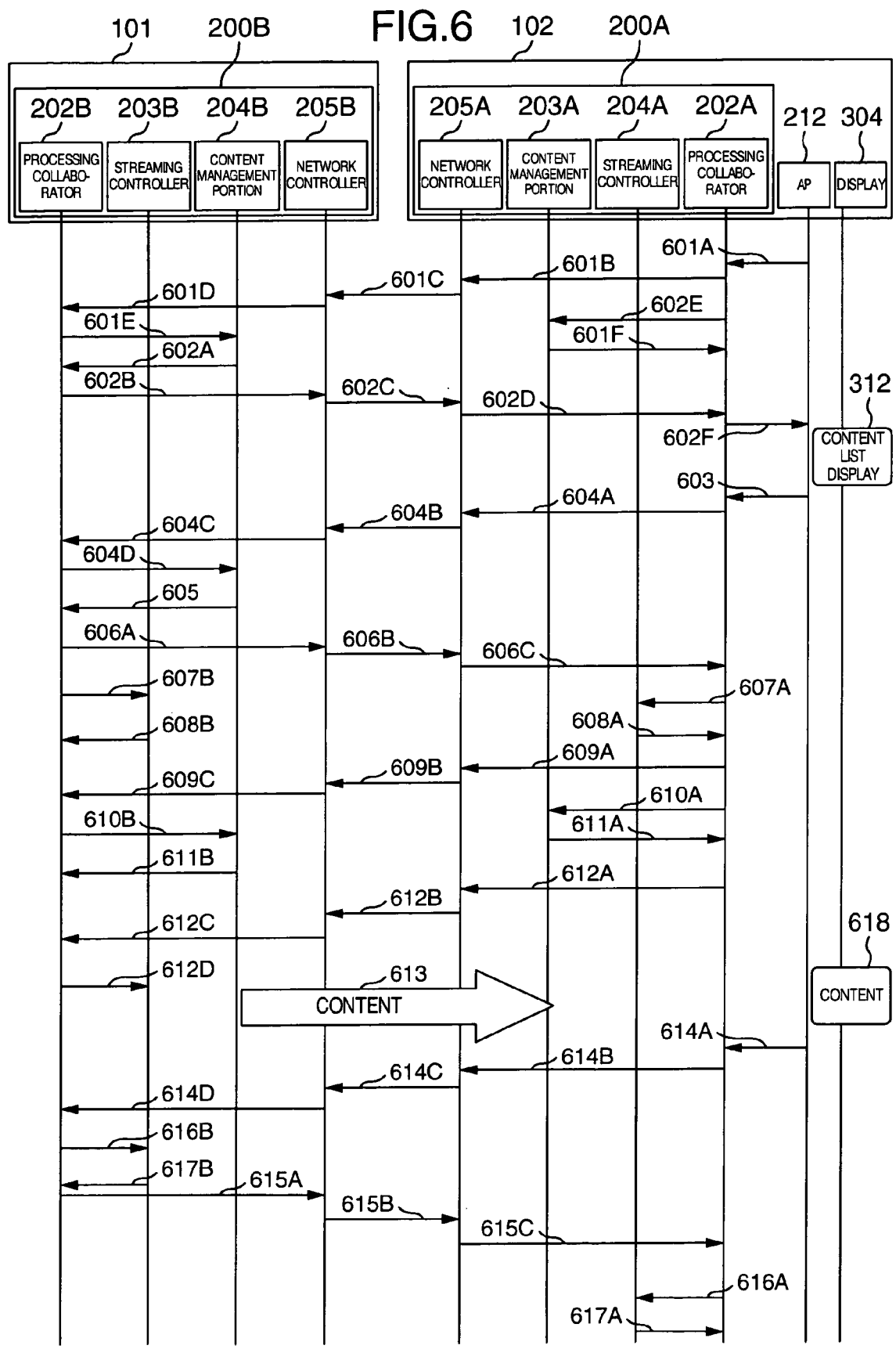

FIG.8

800 SELECTION REFERENCE METHOD FOR CONTENT FILE TRANSFER SYSTEM

| TYPE | JPEG | | | MPEG | | |
|---|---|---|---|---|---|---|
| DIGITAL RIGHTS MANAGEMENT INFORMATION (COPY CONTROL) | NO | | YES | NO | | YES |
| PROCESSING OF PLURAL CONTENT FILES | NO | YES | — | NO | YES | — |
| FILE TRANSFER METHOD | UTILIZATION OF FILE TRANSFER PORTION | UTILIZATION OF FILE TRANSFER PORTION | UTILIZATION OF STREAMING PROCESSING PORTION | UTILIZATION OF FILE TRANSFER PORTION | UTILIZATION OF FILE TRANSFER PORTION | UTILIZATION OF STREAMING PROCESSING PORTION |

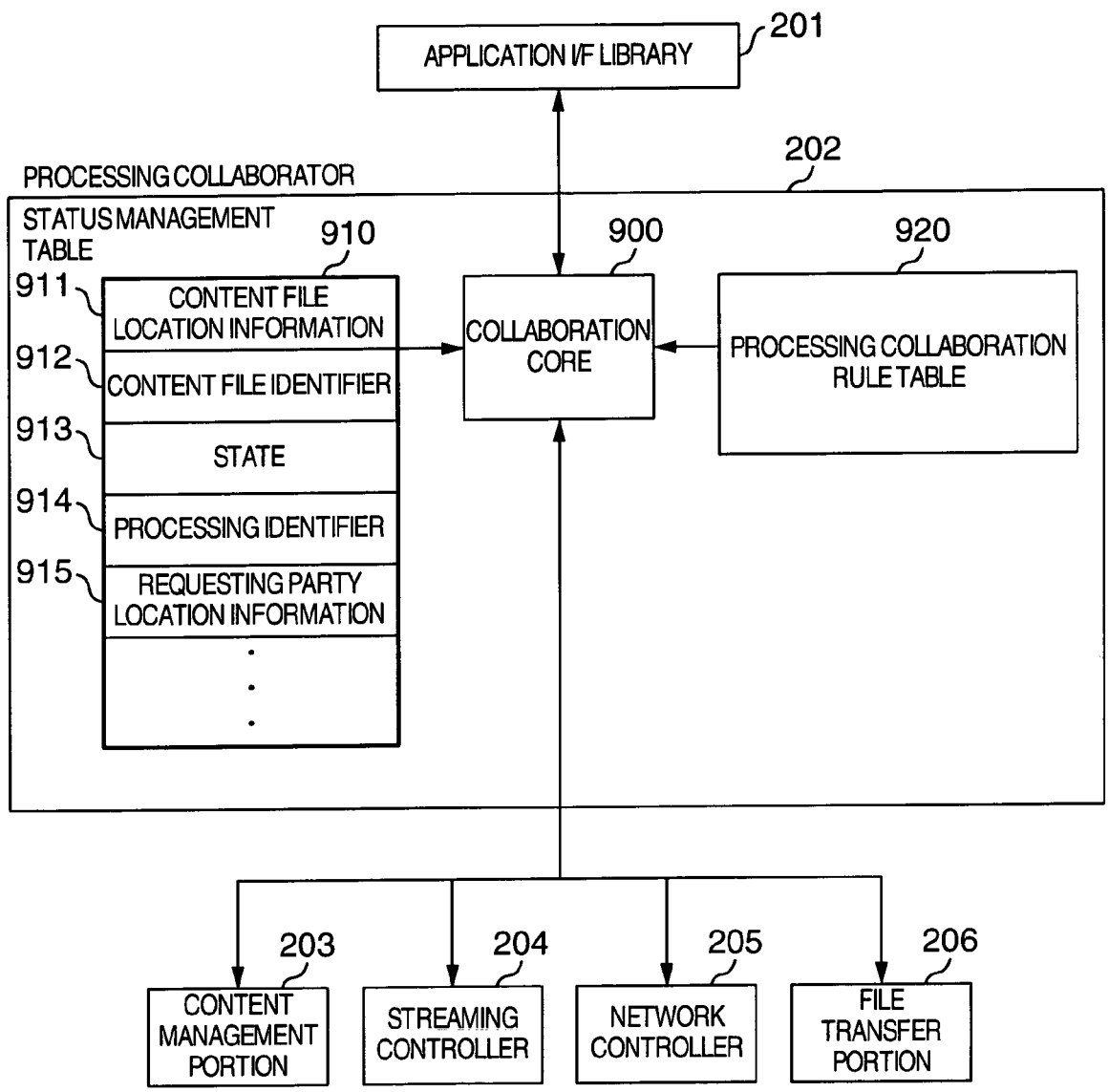

FIG.10

PROCESSING COLLABORATION RULE TABLE (920, 924)

| REQUEST | REQUESTING PARTY LOCATION INFORMATION | CONTENT FILE LOCATION INFORMATION | PROCESSING RULE |
|---|---|---|---|
| refer | LOCAL | — | STEP 1): REFER TRANSMISSION REQUEST TO NETWORK CONTROLLER<br>STEP 2): CONTENT INFORMATION REQUEST TO CONTENT MANAGEMENT PORTION<br>STEP 3): NOTICE OF CONTENT LIST TO AP BY RECEIVING REPLIES 1 AND 2. |
|  | NETWORK | — | STEP 1): CONTENT INFORMATION REQUEST TO CONTENT MANAGEMENT PORTION<br>STEP 2): REQUEST OF CONTENT LIST TRANSMISSION TO NETWORK CONTROLLER BY RECEIVING REPLAY OF 1. |
| setup | LOCAL | LOCAL | STEP 1): REQUEST OF CONTENT UTILIZABILITY JUDGMENT TO CONTENT MANAGEMENT PORTION<br>STEP 2): REPORT TO AP WHEN REPLY OF 1 IS NG AND REQUEST OF WATCHING PREPARATION TO STREAMING CONTROLLER WHEN OK |
|  |  | NETWORK | STEP 1): SETUP TRANSMISSION REQUEST TO NETWORK CONTROLLER<br>STEP 2): REPORT TO AP WHEN REPLY OF 1 IS NG AND REQUEST OF WATCHING PREPARATION TO STREAMING CONTROLLER WHEN OK; PROCESSING TERMINATION WHEN NG<br>STEP 3): TRANSMISSION OF COMPLETION OF CONTENT FILE RECEPTION PREPARATION TO NETWORK CONTROLLER BY RECEIVING REPLY OF 2<br>STEP 4): REQUEST OF SECURITY SETTING TO CONTENT MANAGEMENT PORTION<br>STEP 5): REQUEST OF CONTENT FILE TRANSFER TO NETWORK CONTROLLER BY RECEIVING REPLY OF 4 |
|  | NETWORK | — | STEP 1): REQUEST OF CONTENT UTILIZABILITY JUDGMENT TO CONTENT MANAGEMENT PORTION<br>STEP 2): TRANSMISSION REQUEST OF REPLAY OF 1 TO NETWORK CONTROLLER; PROCESSING IS TERMINATED WHEN REPLY IS NG<br>STEP 3): REQUEST OF CONTENT FILE TRANSMISSION PREPARATION TO STREAMING CONTROLLER<br>STEP 4): REQUEST OF SECURITY SETTING TO CONTENT MANAGEMENT PORTION BY RECEIVING COMPLETION OF RECEPTION PREPARATION FROM NETWORK CONTROLLER<br>STEP 5): TRANSMISSION OF CONTENT FILE BY RECEIVING CONTENT FILE TRANSFER REQUEST FROM NETWORK CONTROLLER |
| play/stop/ pause/ forward/ rewind/ terminate/ record/ | LOCAL | LOCAL | STEP 1): NOTICE OF REQUEST TO STREAMING CONTROL |
|  |  | NETWORK | STEP 1): NOTICE OF REQUEST TO NETWORK CONTROLLER<br>STEP 2): NOTICE OF REQUEST TO STREAMING CONTROLLER BY RECEIVING REPLY |
|  | NETWORK | — | STEP 1): NOTICE OF REQUEST TO STREAMING CONTROLLER<br>STEP 2): REQUEST OF REPLY TRANSMISSION TO NETWORK CONTROLLER BY RECEIVING REPLY OF 1 |

CONTENT UTILIZATION MANAGEMENT METHOD CORRESPONDING TO NETWORK TRANSFER, PROGRAM, AND CONTENT TRANSFER SYSTEM

INCORPORATION BY REFERENCE

The present application claims priority from Japanese application JP2004-088295 filed on Mar. 25, 2004, the content of which is hereby incorporated by reference into this application.

BACKGROUND

This invention relates to utilization of content having digital rights management and co-utilization of the content through a network.

As music recording and playing equipment having content such as pictures and videos owing to popularization of digital video cameras and equipped with a hard disk has become spread, contents such as music and broadcasting contents of digital broadcasting can now be stored easily at home. A hard disk recorder that has replaced a VCR (Video Cassette Recorder) can store not only the broadcasting content but also various kinds of contents described above.

On the other hand, movement and copy of the content between these kinds of equipment have been made by utilizing storage media and by connecting dedicated lines such as USB (Universal Serial Bus) networks, IEEE1394 or the like. Since each of equipment has the IP network function, it has become popular to download the content from the Internet. Therefore, reference to the contents stored in each of equipment has often been required.

With the technical background described above, a security function that permits only authentic users to utilize the contents (reference, transfer, copy, etc) but prevents utilization of the contents by unauthentic users has been accomplished or proposed because degradation of image quality is less in the case of the digital content.

JP-A-2003-273861 contemplates to achieve digital rights management by a system that stores an encrypted file and an execution conformation processing program in a storage medium on the basis of a master file containing encrypted contents in a server device, acquires a content utilization permission from a client device (portable device) to the server device when a plurality of client devices utilizes the encrypted file through the storage medium, acquires then a cipher key of the content and plays the content.

However, the technology described above decides utilizability of the content when the content is utilized but does not judge it at the time of distribution/transfer of the content. Therefore, the technology involves the problem that it is not suitable for content utilization for real-time distribution/transfer of the contents stored in a server device through a network. The technology cannot either transfer an optimam content corresponding to various digital rights management rules or kinds.

Still another problem of the technology is that the content stored in the own device and the content looked up through the network cannot be managed by the same utilization system.

SUMMARY

The invention provides a system or apparatus and so on that decides accessibility on the basis of information of a requesting device and digital rights management of content when a utilization request of the content is made through a network.

The invention also provides a system or apparatus and so on that select a content transferring method corresponding to a content format when content utilization is possible.

The invention also provides content utilization of content stored in a hard disk of own device (hereinafter called "local content") and utilization of content through a network by use of the same interface.

In order to provide system or apparatus and so on described above, in a content management device having a hard disk for storing a plurality of content files and a networking function of transmitting the content files to other device, the invention manages a utilization condition and a utilization state in such a fashion as to correspond to the content files and decides utilizability of a content file from information of a transmitting device of a utilization request when the utilization request of the content is made. When utilization is not judged as impossible, the invention notifies the transmitting device of the utilization request of the decision that the content file cannot be utilized.

The invention selects a transmission method of a content file, i.e. either streaming transfer for transferring in a predetermined cycle the file content in the form of a plurality of packets or file transfer for transferring burst-wise the content file.

The invention provides an interface having a displaying function of a local content file and a displaying function of a content file stored in a device connected through a network and displaying the local content file and the content file stored in the device connected through the network.

In a device for managing content files, the invention accomplishes utilization of the content file inside the device and utilization of the content files through a network in such a fashion as to correspond to the utilization condition for each of the content files.

BRIEF DESCRIPTION OF THE DRAWINGS

FIG. 4 is a table showing a construction of content management information used in the embodiment;

FIG. 5 is a table showing an example of an application I/F library;

FIG. 6 is a diagram showing a processing flow at the time of play of contents through a network in the embodiment;

FIG. 8 is a table showing a selection reference method of a content file transfer system in the embodiment;

FIG. 9 is a block diagram showing a construction of a processing collaborator in the embodiment; and FIG. 10 is a table showing an example of a collaboration processing rule table in the embodiment.

DESCRIPTION OF THE EMBODIMENTS

In a device including a hard disk and a network interface and having a function of storing and distributing contents, this invention provides a content transferring system that judges whether or not a content should be transmitted in response to a content request transmitted through a network or a content request raised inside its own device on the basis of attributes of a content or program such as digital rights management information and access limitation and notifies the requesting device of the judgment result. The invention provides further a system that can accomplish content control by use of the same interface regardless of connection/disconnection of the network.

More specifically, in a device having a hard disk for storing content files and having a networking function for transmitting the content files to other device, the invention provides a content utilization management method, a device for accomplishing the method and a system comprising the device. The device includes a content management DB (Data Base) for managing a utilization condition and a utilization state corresponding to a content file, a network controller for acquiring content information through a network and transmitting and receiving a content utilization request, a streaming controller for controlling a streaming processing portion for periodically transmitting the content in the form of a plurality of packets, a file transfer portion for burst-transferring the content, a processing collaborator for causing these constituent members to collaborate with one another, and a control access controller having an application interface portion for accepting a local/remote content file utilization request. When the content utilization request is accepted through the application or the network, utilizability of the content is judged from the content utilization condition, the content utilization state, the utilization object and the utilization requesting device. When utilization is not permitted, rejection of utilization is transmitted to the requesting device through the network. When utilization is permitted, the streaming controller or the file transfer portion is selected depending on the type of the content file and the content is then transmitted.

The embodiment will be hereinafter explained with reference to the accompanying drawings.

Figure 1:
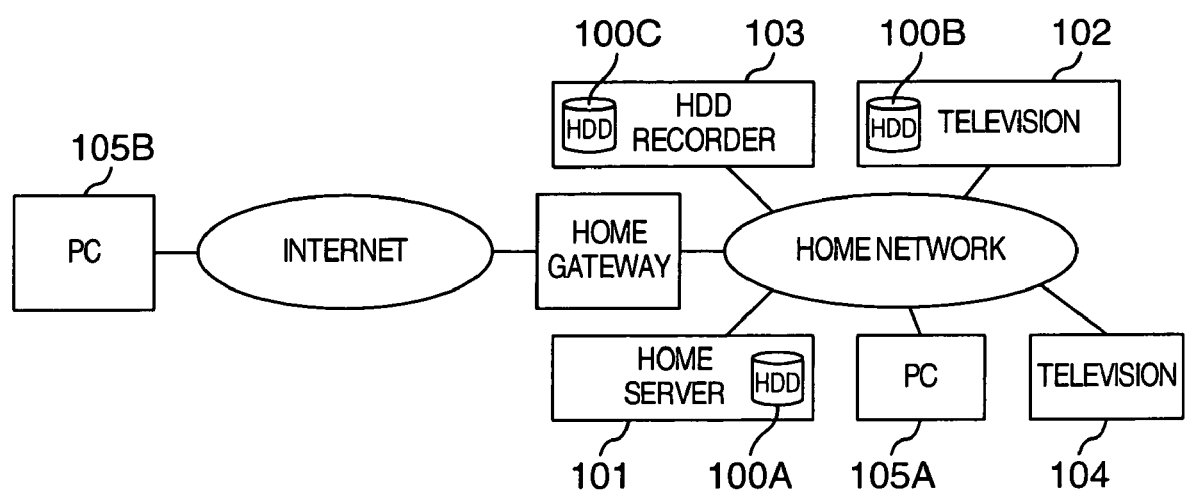
FIG. 1 is a block diagram showing a system construction of a first embodiment of the invention.

FIG. 1 is a structural view showing a network system according to the first embodiment.

The network system includes a home network, a PC 105B to be connected to the Internet and a home gateway for connecting the home network to the Internet. The home network includes an HDD (Hard Disk Drive) recorder 103 having a hard disk 100 for storing content files such as broadcasting, picture and music and a network interface, a television 102, audio-video equipment such as a home server 101, a PC 105A having a networking function and a television 104.

In such a system, the contents stored in the HDD 100 can be utilized on the PC 105 or the television 102 or 104 through the home network or through the network such as the Internet.

Figure 3:
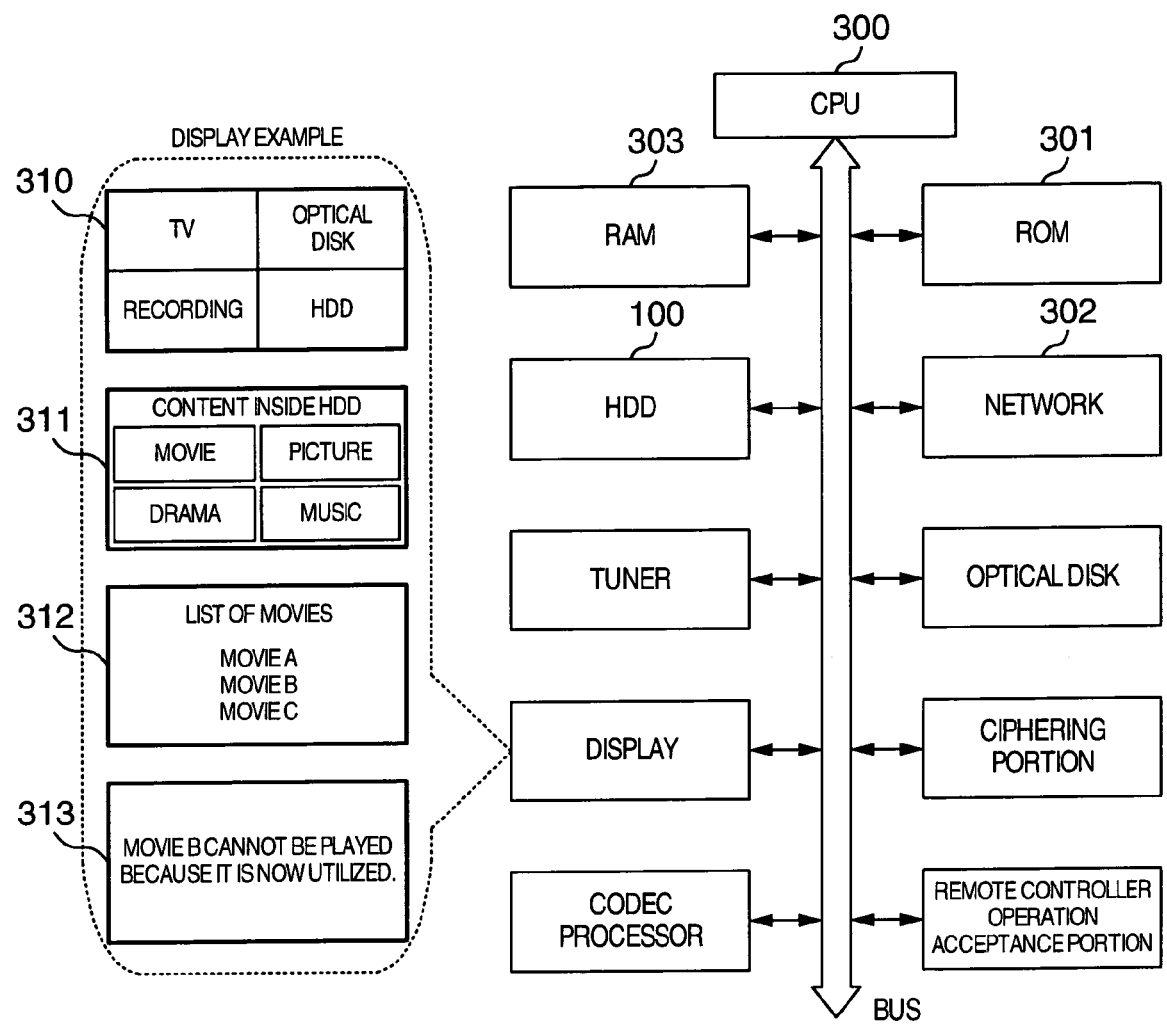
FIG. 3 is a block diagram showing a hardware construction for accomplishing the embodiment.

FIG. 3 shows an example of a hardware construction of audio-video equipment having the HDD 100 and the networking function. The audio-video equipment includes an ROM 301 for storing programs, a CPU 300 for executing the programs, an RAM 303 utilized to execute the programs, an HDD 100 for storing content files, a tuner for receiving digital broadcasting, a network for establishing connection with the Ethernet (registered trademark) and a wireless network, a codec processing portion for visualizing the content files, a display 304 for displaying the content files, an optical disk as a medium interface for storing the content files, a cipher accelerator as a dedicated hardware for executing cipher processing such as DES and AES corresponding to digital rights management and a remote controller operation receiver for accepting signals from a remote controller.

Figure 2:
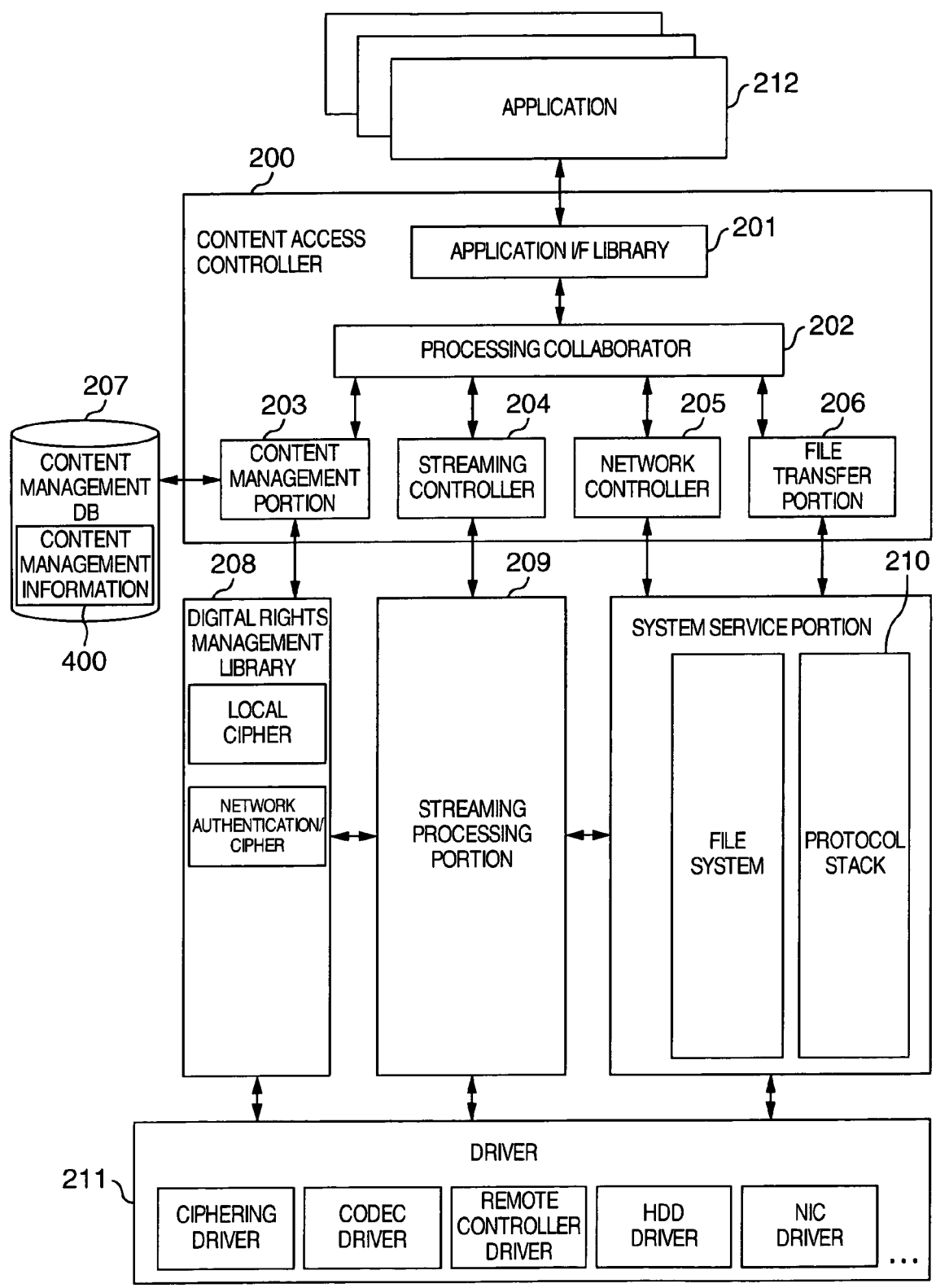
FIG. 2 is a block diagram showing a software construction for accomplishing the embodiment.

FIG. 2 shows an example of a software construction for accomplishing the embodiment. This software is stored in the ROM 301 and is executed by use of the RAM 303 in the CPU 300 when executed.

As shown in FIG. 2, this software includes a driver 211 corresponding to a plurality of kinds of hardware such as HDD and NIC (Network Interface Card), a system service portion 210 having a protocol stack and a file system of communication ordinarily provided by a system of OS, a streaming processing portion 209 used when a processing of a content file is divided into continuous packets, a digital rights management library 208 corresponding to digital rights management of the content file, an application 212, and a content access controller 200 interposed between the application 210 and each of the system service portion 210, the stream processing portion 209 and the digital rights management library 208.

Here, the streaming processing is a real time processing that transfers the content stored or inputted to the network or to other storage medium such as a processing that reads out the content file from the HDD 100, converts it into packets and transmits them to the network, or a processing that stores a broadcasting content received from the tuner into the HDD 100.

The digital rights management library 208 includes a local cipher library used as a cipher for storing the content file in the HDD 100 and a network authentication and encrypt library used for transferring the digital content onto the network. The local cipher library is the one that gives information for deciphering an encrypted content or ciphering the content to the streaming processing portion. Key information is further ciphered in such a manner as to correspond to the encrypted content file. When the local content is visualized, for example, the library reports three kinds of information, that is, a local cipher system, a cipher system of the key information necessary when access is made to the local content and its key information, to the stream controller. Consequently, the streaming processing portion delivers the encrypted content file read out from the HDD 100 and the key information and the cipher system deciphered by the information given from the library to the codec processor through the codec driver. The codec processor deciphers the content by use of the key information given thereto. The network authentication and encrypt library is the one that has certification for transmitting and receiving the digital contents through the network and executes an authentication processing. In this authentication processing, the network authentication and encrypt library reports the key information at the time of the transfer to the shared network to the streaming processing portion. In consequence, the streaming processing portion 209 can decipher the content file read out from the HDD 100 and encrypted by use of the information reported from the local cipher library, can cipher the content file by use of the information reported from the network authentication and encrypt library and can transfer the content file to the network.

The content access controller 200 includes, in such a fashion as to correspond to the content files, a content management portion 203 that manages the content management database (hereinafter called "content management DB") 207 for managing content management information shown in FIG. 4 in such a fashion as to correspond to content files and judges whether or not the content can be utilized on receiving a utilization request of the content, a streaming controller 204 for controlling the streaming control portion 209, a network controller 205 for receiving the content utilization request from other device connected to the network or transmitting the content utilization request to other device, a file transfer portion 206 for transmitting and receiving the content file from and to the network, a processing collaborator 202 for accepting the request from the application 212 or a request through the network, executing setting for this request to the streaming controller 204, the file transfer portion 206 and the network controller 205, returning the content information acquired from the content management portion 203 to the requesting device, and an application I/F library 201 for accepting the request for the utilization of the content file stored in other device through the network and the utilization of the content file stored inside the own terminal. Incidentally, the functional module for transferring the contents stored in the HDD such as the streaming control portion 204, the file transfer portion 206, etc, to the outside of the HDD will be generically called "content transfer portion".

The file transfer portion 206 is used for transferring the content file through the network in the same way as the streaming processing portion 209. The streaming processing portion accomplishes the transfer processing that transfers on the real time basis the contents stored or inputted described above to the network or to other storage medium, divides the content file into a plurality of continuous packets and transfers them at a certain constant rate. Therefore, this is the transfer method suitable for the device connected to the network to arbitrarily reproduce the transmitted content while executing network transfer. In contrast, the transfer using the file transfer portion 206 is the one that executes burst transfer of the content file through the network and plays the content file after the transfer is completed. This method is suitable for transferring a picture content file such as JPEG (Joint Photographic Experts Group). A processing for moving the content does not by itself require a real time property and the transfer can be made by use of the file transfer portion. When a service for starting reproduction of the file content during transfer is started at the transfer destination or when a processing (reproduction, recording, etc) of a plurality of content files stored in the HDD 100 is made at the transfer destination, the real time property of other content files may be affected. Therefore, the file transfer portion 206 selectively utilizes the streaming processing potion 209 depending on the file type and the transfer object. When so-called "copy-once" is stipulated as the digital rights management information 408, the content cannot be stored in the hard disk. In this case, the streaming processing portion 209 must be selected.

FIG. 8 shows a selection reference table 800 of the content file transfer system. The processing collaborator 202 selects the file transfer portion 206 and the streaming processing portion 209 in accordance with the reference table.

FIG. 9 shows the construction of the processing collaborator 202. The processing collaborator 202 includes a collaboration core 900 that accepts the request from the application I/F library 201 and the request from other device connected to the network through the network controller 205 and executes a collaboration processing with the content management portion 203, the streaming controller 204, the network controller 205, the file transfer portion 206 and the application 201 as a collaboration processing by using a collaboration processing routine table 920 with a status management table 910.

The status management table 910 is the table that manages the processing about the content files and includes a plurality of entries. Each entry includes a content file location information 911 representing location information of the content file to be processed, a content identifier 912 for identifying the content file to be processed, a state 913 for managing a request and its processing rule, a processing identifier 914 for identifying the processing and a location information 915 of a requesting device. The content file location information 911 represents hereby the information for identifying a device storing the content file inside the home network such as an IP address and the location information of the requesting device represents the information for identifying equipment as the requesting party of the content file such as an IP address.

The processing identifier 914 is an identifier for specifying the processing and is contained in a packet exchanged through the network for processing.

The state 913 is determined by a step stipulated by the processing rule 924 of a collaboration processing table 920 shown in FIG. 10 and requesting device location information 915 representing the location information of the requesting device.

As shown in FIG. 10, the processing rule 924 is stipulated for the collaboration processing table 920 on the basis of the request accepted, the location information of the requesting device and the location information of the content file, and the processing collaborator 202 serially executes the processing of the content management portion 203, the streaming controller 204, the network controller 205 and the file transfer portion 206 in accordance with the corresponding processing rule.

FIG. 4 shows a structural example of the content management information 400 managed as the content management DB 207 on the HDD 100. These information can be acquired at an arbitrary timing. For example, the information can be generated by analyzing the content received by the device at the transfer destination or can be acquired from the header information added to the content when the content is received. Alternatively, only the content management information may be acquired from the transfer destination of the content before the content is received. A part of the information such as a title name may be acquired through a setting operation by a user at the time of reception of the content. The content management information 400 is the information that is so prepared as to correspond to the content file. The constituent elements of the content management information 400 include a content identifier 401 that is unique on the HDD 100, a title name 402 easily comprehensible to the user, a type 403 representing format information such as JPEG, MPEG2, TS and MPEG4 as the kind of the content, an absolute path 404 representing the necessary location for gaining access to the content file on the HDD (expressed as "/content/file-name 1" in the case where the file name is "file-name 1"), an absolute path 405 ("/metainfo/file-name1/seek") for metadata for storing additional information (such as seek information of the content and its reproduction procedure) necessary for playing the content file, an access level 406 representing the user or terminal capable of gaining access to the content, a digital rights management domain 407 for registering a domain representing a reference of digital right management as an identifier, such as license information and key information of the authentication and decrypt processing used for digital rights management, and a content utilization status 409 representing whether or not the content is utilized at present in processing such as playing or copying. The digital rights management information 408 may be ciphered and preserved for the purpose of safety.

An accessible user ID, a terminal ID or a network for which access is permitted is set as the access level 406. When access is permitted only from the home network, an identifier "In-house" is registered and when access is permitted through only the Internet, an identifier "Internet" is registered. When the access level is not set, an identifier "An" is registered. When access through a network is not permitted, an identifier "Never" is registered.

When the digital rights management domain 407 is a content file obtained from the reception of a broadcasting program, for example, a domain "ARIB" is set. When the domain 407 is the content file obtained through the Internet and is based on DRM, a domain "NTT-DRM" is set. When digital rights management does not exist, "NONE" is set.

As to the content utilization status, a state identifier representing that the content file is in use is set, for example. The state identifier includes in-playing, in-copying and in-movement. When a plurality of utilizations is accepted, the number of times of acceptance of the processing may be so provided as to correspond to the state identifier. In the case of the content file having the watching frequency, a counter of the watching frequency is provided.

The digital rights management information 408 includes as license information, an authentic method, an encryption method, a usage limitation and copy control information for designating the number of copy-to destinations. When the content file is looked up, the content management portion 203 judges by use of these kinds of information whether or not the file content can be utilized. While the content of the content management information 400 may be prepared when the content file is recorded to the HDD 100, it can be also prepared on the basis of the information the content file originally has, and may be set by setting in advance a default value. It is also possible to let the user set the content by use of an interface as a recording completion processing.

FIG. 5 shows a list of libraries 201 the content access controller 200 provides to the application 212. When referring to and utilizing the content on the HDD 100 of its own device or on the HDD 100 provided to the device on the network, the application 212 can use the libraries 201 without depending on the storage location of the content. The libraries 201 include a library relating to reproduction of the content (setup, play, pause, forward, rewind, terminate), a library relating to recording (record) and a library (refer) relating to the reference of the content.

FIG. 6 shows a processing flow when the content is utilized through the network.

The explanation will be given hereby about the case where one of the content files stored in the home server 101 is selected by referring to the list of the content files stored in the device connected to the home network from the television 102 having the HDD 100, and the content transferred through the network or the content broadcasting stored in the television 102 is watched through the television 102. Incidentally, this method can also be applied to the case where the content stored in other device is watched through an arbitrary device shown in FIG. 1.

First, the functions that can be accomplished by the television 102 are displayed on the display 302 of the television 102 so that they can be selected as shown in FIG. 3 (310). When the hardware construction shown in FIG. 3 is employed, the display 302 displays watching of the broadcasting (TV), watching of the content from the optical disk and writing of the content file to the optical disk (optical disk), a recording reservation function to the HDD 100 (recording) and a function of utilizing the content file stored in the HDD 100 (HDD). In other words, this construction has the displaying function of the local content file and the function of displaying the content file of the device connected through the network, and displays the local content file and the content file of the device through the network. The local content file displaying function is the function that displays the title name, on the display 302, included in the content management information having been registered inside the HDD 100 provided to the television. Upon a connection of the device to the network, it is advertised that the content information has been registered in the HDD 100, and the function of the device to be connected through the network for indicating the contents files manages the IP address of the device advertised. When the content file is displayed, a content list request is transmitted to the IP address of the device advertised and managed and the title name is collected as the content information of each device. The title name so collected and the title name of the local content referred to in the manner described above are altogether displayed on the display 302. The communication protocol relating to advertisement and collection may be packaged in accordance with a protocol called "UPnP".

When the HDD 100 is selected through the remote controller, the application 212 corresponding to the operation of the remote controller transfers the content list request (Refer) 601A to the content access controller 202A. The processing collaborator 200A of the content access controller 200A secures a new entry in the status management table 910, sets "local" as the requesting party location information 915, sets "Refer0" to the state 913 and also sets the processing identifier 914 that is unique inside the processing collaborator. Here, "Refer0" represents the state of a plurality of processing steps necessary for accomplishing the processing corresponding to the content list request 601A.

Next, while the processing collaboration routine table 920 is looked up, the processing is executed in accordance with the requesting device location information, the location information of the content file and the processing rule 924 corresponding to the request.

As Step 1, the processing collaborator 202 asks the network controller 20A a content list request that represents the list of the content files stored in the HDD 100 of all of the devices connected through the network (601B). When the response to this request is received, it is possible to identify to which processing the response corresponds because the processing identifier 914 is contained in this request. The processing collaborator 202 sets the state 913 to "Refer1" in order to represent that Step 1 is completed (601B, 601C).

As Step 2, the processing collaborator 202 asks the list of the local content files to the content management portion and also requests the local content list (601E). The processing collaborator 202 then sets the state 913 to "Refer2" to represent that Step 2 is completed.

The content management portion 203A selects the content to be displayed in accordance with the access level 406 of the content management information 400. When "In-house" that permits access from the home network is set as the access level 406, the list having all the content files as the object is replied to the processing collaborator because this reference is the reference inside the same device. When the user ID is set as the access level 406, it is compared with the user ID inputted by the user when the terminal is not used, and the list of the coincident content files is replied to the processing collaborator. This user ID is stored as the file at the time of input and the content management portion reads out the user ID from this file and compares it.

Accepting the "refer" transmission request (601B), the network controller 205A has the function of advertising the service of its own by plug-and-play on the network in accordance with a protocol called "UPnP", for example, and can grasp in advance whether or not the device having the HDD 100 is connected to the network. The network controller 205A transmits the content list request (601C) to all the devices connected to the network and grasped.

The explanation will be given about the home server 101 as an example of the device accepting the content list request 601C. The network controller 205B of the content access controller 200B of the home server 101 accepts this request as the location information of the IP address of the requesting device (television 102) and reports it to the processing collaborator 202B.

Receiving the notice, the processing collaborator 202B secures a new entry in the status management table 910, sets "Network" as the requesting device 915, sets "Refer0" to the state 913 and further sets the processing 914 contained in the request.

Next, the processing collaborator 202B refers to the processing collaboration rule table 920 and executes the processing in accordance with the corresponding processing rule 924. The processing collaborator 202B raises the content list request to the content management portion 204B as Step 1 (601E). This request contains the location information of the requesting device and the processing identifier. The processing collaborator sets the state 913 to "Refer1". Because the IP address as the location information is not the address of its own device, the content management portion 204B returns to the processing collaborator 202B, as the list of the content files that can be utilized through other devices connected through the network, the information of the content files in which the access level 406 of the content management information 400 is not "Never" and "Internet". Because the processing identifier at the time of request is contained in this return notice, the request and the reply can be associated with each other and Step 2 is executed as the next processing of the state managed by the status management table. Transmission of the content list is requested as Step 2 to the network controller 205B (602B) and the content list is reported to the television (602C, 602D). After the processing is completed, the content of the status management table 910 is cleared.

Accepting the reply of the content list from the network controller 205A, the processing collaborator 202A selects the corresponding entry from the status management table from the processing identifier contained in the reply and executes Step 3 as the next step to the processing rule of the processing collaboration processing rule table from the state 913. In other words, the processing collaborator 202A reports the content list obtained by referring to the content management portion A inside its own device, the content list acquired through the network controller 205A and the location information to the application, clears the status management table 910 and finishes processing.

The application 202 displays the content inside the HDD as shown in FIG. 3 (311). In this instance, the location information of the content need not be displayed on the display, in particular. The location information is the information for identifying the device in the home network in which the content file is stored. UUID (Universal Unique Identifier) stipulated by UPnP capable of uniquely identifying each of the devices in the home network may be used, for example. In this case, UUID and the IP address must be associated with each other. This association can be made in accordance with the UPnP protocol when the device connected to the home network is detected. Alternatively, the IP address of the device may be used as the location information. This embodiment will hereinafter use the IP address as the location information.

Here, an example where all the contents are categorized to movies, pictures, etc, is represented (312). The category name can be appropriately added or corrected.

A specific retrieval key such as a title, a type or a date may be designated for this content list.

When a movie is selected from the content list 311 displayed on the display 304, titles associated with the movies are displayed on the display (312) and when the content to be played is designated from the title, the application 202 transfers a content reproduction request (Setup) 603 to the processing collaborator 202A of the content access controller 200A. The content reproduction request 603 contains information for identifying the content to be played (content identifier), location information representing the location at which the content is stored and the object of utilization (play) of the content.

On the basis of the content reproduction request 603, the processing collaborator 202A generates the entry of the status management table 910 and sets the content file location information 911, the identifier of the content file 912, "setup0" as the state, the processing identifier 914 and "local" as the requesting device location information. When the IP address as the location information of the content file is not the IP address of the own device, the processing rule is selected from the processing collaboration rule and the content utilization request is sent as the processing of Step 1 to the home server 101 through the network controller 205A (604A to 604C). The content file identifier and a request "setup" as the utilization object inside the command at the time of the request are set. The state of the condition management table is set to "setup1".

When the content file does not have the location information, it is the local content file. Therefore, the content utilizability judgment is required as Step 1 for the content management portion on the basis of the processing rule 924 of the processing collaboration rule table 920. The content file identifier in the command at the time of request and "setup" as the utilization object are notified. The reply of Step 1 is received as Step 2 and when utilization of the content is possible, the content file is watched by the streaming controller or merely by file read. The state of the status management table is set to "setup-complete". When utilization is not possible, the report is made to the application 212 and the display 304 displays the notice that playing is not possible as shown in FIG. 3 (313). In other words, the report is given to the user to the effect that the designated content cannot be utilized, and the entry of the status management table 910 is cleared.

Figure 7:
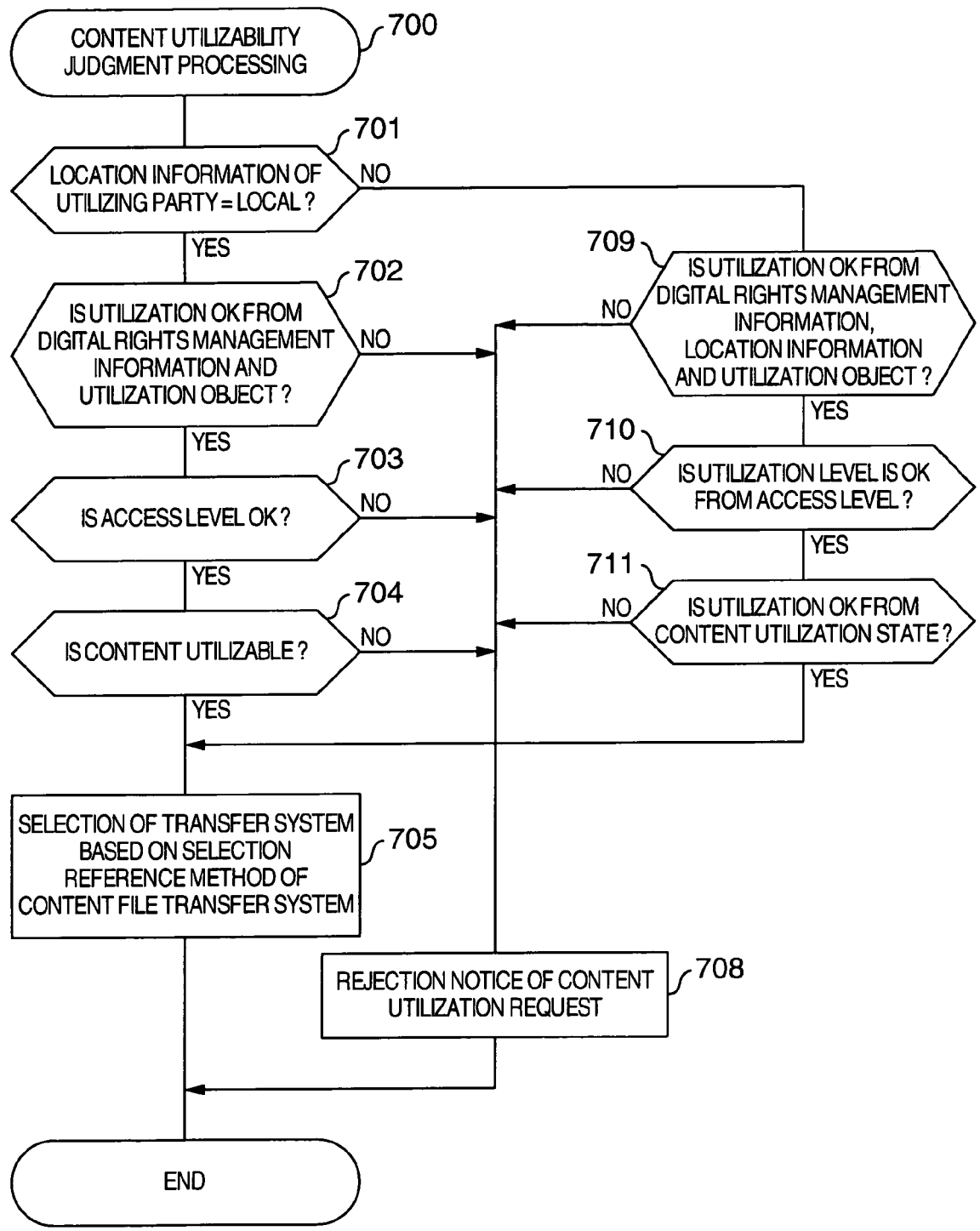
FIG. 7 is a flowchart showing a content utilizability judgment processing in the embodiment.

FIG. 7 shows the processing flow of content utilizability judgment executed in the content management portion 203. First, whether or not the local information of the utilizing device is local is judged (701). Next, the digital rights management information 408 of the content management information 400 corresponding to the designated content is looked up and whether or not utilization is possible is judged from the location information and the utilization object (702). Since the utilization object is "play" from "setup", whether or not utilization is possible is judged from the usage limitation of the digital rights management information 408. When the utilization object is "record", utilization is judged as NG because recording cannot be made if the copy control information of the digital rights management information 408 is "copy-once".

Next, the access level 406 is checked (703). This access level checks the limitation of the device used, the limitation of the user level or whether or not the access from the home network or the external network is possible. Because utilization is local utilization in this case, it is necessary to confirm whether or not the user ID is coincident when the user ID is set.

Next, whether or not overlapping utilization is possible is judged depending on the content utilization status 409 (704). When the content is under movement, the content cannot be played and content utilization becomes NG. When the watching frequency is stipulated, it is compared with the use frequency of the content utilization state and utilization is judged as OK when the use frequency is below the watching frequency. When the simultaneous watching frequency is stipulated as the digital rights management information 408, whether or not watching is possible is judged from the content use state.

When utilization is possible, the transfer system based on the selection reference 800 of the content file transfer system is selected. In the case of utilization of the streaming processing portion, utilization of the streaming processing portion is selected and in the case of utilization of the file transfer portion, utilization of file read is selected. The transfer system is returned with the watching possibility judgment to the processing collaborator 202. The processing collaborator 202 executes the processing of Step 2 shown in the processing rule 924 of the processing collaboration rule table 920. Here, the processing rule is described on the assumption that the streaming processing portion 209 is utilized as the transfer system. In the case of file read, the processing may be executed by reading the file, conducting decoding processing corresponding to the type of the content file and displaying the content file on the display.

When the content file cannot be utilized, the processing collaborator 202 gives a notice to the application 212, displays the notice that play cannot be made on the display 304 as shown in FIG. 3, and notifies the user that the designated content cannot be utilized.

Next, the processing of the home server 101 when the content utilization request is transmitted to the home server 101 through the network controller 205A will be explained.

The processing collaborator 202B first generates the entry of the status management table 910 on the basis of the content utilization request (604C) and sets "local" as the content file location information 911, the content file identifier 912 contained in the content utilization request, "setup0" as the state 913, the processing identifier 914 contained in the content utilization request and the IP address of the television as the requesting device location information 915. The processing rule 924 is selected from the processing collaboration rule table 920. Content utilizability judgment is requested to the content management portion 204B as the processing of Step 1. At the time of this request, the content file identifier contained in the content utilizability judgment request 604C accepted through the network, the utilization object and the location information of the requesting device are transmitted. The state 913 of the condition management table 910 is set to "setup 1".

The content utilizability judgment processing 700 in the content management portion 204B is executed in accordance with the procedure shown in FIG. 5. In the check of the access level, content utilization is refused when the access level is "Never". When the access level is "In-house", whether or not the reported IP address and the sub-net of the IP address of the own device are coincident is confirmed and content utilization is refused when they are not coincident.

When the content utilization request is accepted, the transfer method based on the selection reference method 800 of the content file transfer system is selected as the content utilizability judgment processing 700.

When the processing collaborator 202B accepts the utilization request for the digital content of a movie in this embodiment by way of example, utilization of the streaming processing portion is selected. The content management portion 204B transmits the transfer system with the watching possibility judgment to the processing collaborator 202B (605). The processing collaborator 202B executes the processing of Step 2 shown in the processing rule 924 of the processing collaboration rule table 920. The processing collaborator 202B notifies the television of the watching possibility judgment result and the transfer system (607A to 606C). When the watching possibility judgment result is NO, the processing collaborator clears the status management table and when it is YES, the processing collaborator sets the state 913 to "setup2".

Next, the processing collaborator 202B notifies the streaming processing portion 203B of the content, the path information to the meta-data, the necessary authentication ciphering and the location information of the destination of the content as the streaming setting request in accordance with the instruction of the transfer system from the content management portion 204B (607B). Consequently, the streaming control portion 203B starts the preparation of the file access, the network transfer and authentication ciphering. The processing collaborator 202B sets the state of the status management table 910 to "setup3".

The processing collaborator 202A on the television side receives the watching possibility judgment result, retrieves the corresponding status management table 910 and executes the processing of Step 2 in accordance with the processing rule 924 of the processing collaboration rule table 920. When the watching possibility judgment result is NO, the processing collaborator 202A gives a notice to the application 212 and displays the notice on the display 304 to the effect that playing cannot be made as shown in FIG. 3 (313). Further, the processing collaborator 202A clears the status management table 910 and finishes the processing.

When watching is possible, the processing collaborator 202A raises the streaming setting request 607A to the streaming controller 204A in accordance with the transfer system and sets the state of the status management table 910 to "setup2". Completion of setting of the streaming processing portion 209 is reported to the processing collaborator 202A (608A). The processing collaborator 202A similarly looks up the status management table 910 and the processing collaboration rule table 920 and transmits the connection setting completion notice as the next Step 3 of the processing rule 924 to the processing collaborator B of the home server 101 (609A to 609C). The processing collaborator A requests digital rights management security setting to the content management portion as Step 4 (610A) and sets the state 913 of the status management table 910 of the processing collaborator B to "setup4".

Receiving the connection setting completion notice 609C, the processing collaborator 202B of the home server 101 requests digital rights management security setting to the content management portion 204B as Step 4 in accordance with the status management table 910 and the processing rule 924 of the processing collaboration rule table 920 (610B) and sets the state 913 to "setup4".

Receiving the digital rights management securing setting requests 610A and 610B, the content management portions 204A and 204B notify the streaming controllers 203A and 203B of the key information corresponding to the local cipher (the metadata of the local cipher is expressed as (/metainfo/file-name1-LC) of the digital rights management information 408 of the content management information 400 corresponding to the content file) on both sides of the home server 101 and the television 102.

To further execute the ciphering processing on the network and the authentication processing between the home server 101 and the television 102, the network authentication/cipher library of the digital rights management library is operated. To accept the connection setting request of TCP/IP for executing the authentication processing on the side of the home server 101, a socket as a logical interface for delivering data packets used for the TCP/IP communication is opened as the preparation of the network and the IP address, the reception address and the port number on the side of the television 102 are bound to the socket. Thereafter the authentication request is awaited. The socket for the authentication processing is opened on the side of the television 102 and the authentication request is transmitted to the home server 101. The certification corresponding to the device used for this authentication is set in advance to each of the devices and is automatically looked up from the network authentication/cipher library. A seed as the base value for generating the cipher key used for transferring the content is stipulated in the authentication phase between the home server 101 and the television 102. The cipher key is generated from the seed and an operator stipulated. The network authentication/cipher library notifies the streaming processing portion 202 of the seed. Receiving completion of the library processing, the content management portion 230 notifies the processing collaborator 201 of completion of digital rights management security setting.

Receiving the digital rights management security setting completion report (611A), the processing collaborator 202A of the television transmits the content transmission request to the home server 101 (612A to 612C) and sets the state of the status management table to "setup-complete".

After the processing collaborator 202B of the content access control portion 200B of the home server 101 receives digital rights management information security setting and the content transmission request 612C from the television 102, the processing collaborator 202B instructs the streaming control portion 203B to start the transmission of the content (612D). Furthermore, the processing collaborator 202B sets the state of the status management table to "setup-complete".

The content on the HDD 100 of the home server 101 can be played on the television 102 by the procedure described above (618).

To execute the processing of the content file, the streaming processing portion 209 generates the flow (stream) of processing in accordance with the request of the streaming controller 204. When the content file read out from the HDD is transmitted through the network, for example, a module for reading out the content file from the HDD, a module for reading out seek information of the content file so read out, a module for dividing the content file into sets of a plurality of packets to be transmitted to the network by looking up the counter value as the play timing information containing in a plurality of packets constituting the content file, a module for handing over the information of the content file to the ciphering driver so as to decipher the local cipher of the content file and to conduct ciphering in such a fashion as to correspond to the network transfer and a module for transferring the content file as the packet to the network are connected to one another as one stream, and have the content file to be played, that is acquired from the processing collaborator 202 through the streaming controller 204, the seek information and the local cipher information as the initial values of the associated modules. Furthermore, the streaming processing portion 209 has the seed information of the key information acquired from the digital rights management library as the initial value of the associated module. Each module receives the content transmission start from the content controller 204, is operated on the basis of the initial value so given and transfers the content file to the network.

The application 212 receives the content transfer termination 614A through the operation of the remote controller on the side of the television 102 and notifies the content access control portion 200A of the content transfer termination request 614A. Receiving this request 614A, the processing collaborator 202A retrieves the entry representing the streaming state of the control object the state 913 of which is "setup-complete" in the status management table and notifies the content access control portion 200B of the home server 101 of completion through the network controller 205A as the processing of Step 1 in accordance with the processing rule 924 of the processing collaboration rule table 920 (614B to 614D). The state 913 is set to "stop 1".

Receiving the content transfer termination request, the processing collaborator 202B in the home server 101 retrieves the entry representing the streaming condition of the control object the state 913 of which is "setup-complete" in the status management table and notifies the streaming controller 203B of streaming completion 616B as the processing of Step 1 in accordance with the processing rule 924 of the processing collaboration rule table 920. The streaming controller 203B completes the streaming processing. The processing collaborator 202B sets the state 913 to "stop0".

The processing collaborator 202B receives completion 617B of the streaming processing from the streaming controller and notifies the television 102 side of the content transfer termination completion 615A to 615C as the processing of Step 2 in accordance with the processing rule 924 of the processing collaboration rule table 920. The processing collaborator 202B clears thereafter the status management table.

Receiving the content transfer termination completion 615C, the processing collaborator 202A of the television 102 retrieves the entry of the corresponding status management table 913 and notifies the streaming controller 203A of streaming completion 616A as the processing of Step 2 in accordance with the processing rule 924 of the processing collaboration rule table 920. The streaming control portion 230A completes the streaming processing and clears thereafter the status management table.

As explained above, this embodiment judges utilizability of the content in the device having the content, permits content utilization in accordance with digital rights management and can play the content through the network.

Because the digital rights management information of the content, the access level, the utilization condition and utilizability from the utilization requesting party are judged in this way, content utilization can be accomplished in accordance with digital rights management and becomes possible without the necessity for the application to recognize whether the local HDD or the remote HDD is connected through the network. The network transfer method can also be selected depending on the type of the content.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A content transferring method in a content transferring system including at least a first content management device and a second content management device, each including a storage device storing contents and having a networking function of transmitting and receiving a content to and from another device through a network, comprising the steps of:

looking up a list of contents of the second content management device connected to said network by the first content management device;

transmitting a content utilization request from the first content management device to the second content management device having a content designated from said content list;

looking up content management information corresponding to the designated content, and judging whether or not said designated content is transmissible to the first content management device by the second content management device;

in accordance with selection information defining relationship among content types, digital rights management information, and contents transfer methods to determine how to transfer a content, selecting a file transfer method when there is no digital right information for the designated content and transferring the designated content is not being performed, and selecting a streaming transfer method when there is digital right information for the designated content and storing the designated content in the first content management device is prohibited or transferring the designated content is being performed, the file transfer method being a method of burst-transferring content, the streaming transfer method being a method of performing a real time content transferring process;

notifying from the second content management device to the first content management device that selecting the file transfer method or the streaming transfer method has been made and the designated content can be used;

performing in the first content management device an authentication process with the second content management device and a digital rights management security setting, and notifying from the first content management device to the second content management device that the digital rights management security setting is completed; and in the second content management device, when the streaming transfer method is selected to transmit the content comprising a plurality of packets to the first content management device, defining a number of packets to be transferred per unit time based on a counter value showing play timing information contained in the packets, and splitting the content into the defined number of the packets such that transmission of the content is performed by transmitting the defined number of the packets to the first content management device.

2. A content management apparatus having a storage device for storing content and a network interface, the content management apparatus comprising:

a file transfer module for burst-transferring the content through the network interface;

a streaming processing module for controlling a processing path to process the content to or from the storage device; and a content management module, wherein the streaming processing module is configured to:

select a cipher library, a file system and a network processing module depending on a user request, and link the selected library, file system and processing module and create a processing path; and when sending the content comprising a plurality of packets to the network interface, define a number of packets to be transferred per unit time following a present time in the content based on a counter value showing play timing information contained in the packets, and split the content into the defined number of the packets, and transfer the defined number of the packets to maintain transmission rate using the created processing path, wherein the content management module is configured to:

determine whether or not the content can be used by another apparatus in accordance with at least one of digital right management information and intended use for the designated content, in accordance with selection information defining relationship among content types, digital rights management information, and contents transfer methods to determine how to transfer a content, select the file transfer module to transfer the content when there is no digital right information for the content and transferring the content is not being performed, and select the streaming processing module to transfer the content when there is digital right information for the content and storing the content in the another apparatus is prohibited or transferring the content is being performed;

notify the another apparatus of how to transfer the designated content.

3. A content transferring method for a content management apparatus having a storage device for storing a content, a network interface and a codec function, the content transferring method comprising the steps of:

referring to selection information defining relationship among content types, digital rights management information, and contents transfer methods to determine how to transfer a content;

selecting a file transfer method when there is no digital right information for the designated content and transferring the designated content is not being performed, and selecting a streaming transfer method when there is digital right information for the designated content and storing the designated content in the first content management device is prohibited or transferring the designated content is being performed, the file transfer method being a method of burst-transferring content, the streaming transfer method being a method of performing a real time content transferring process, wherein:

when receiving a request of remote-playback through the network interface, judging whether or not a designated content is utilizable based on a utilization condition and copy control information defined under digital rights of each content;

when the copy control information shows prohibition from storing the designated content in a remote storage, when remote-playback before completion of transferring has started, or when other network transferring or local-playback or record processing is in execution, the streaming transfer method is selected in accordance with the selection information;

a necessary cipher library, a file system and a network processing module are selected depending on the request, and the selected cipher library, file system and processing module are linked, and a processing path is created; and a number of packets to be transferred per unit time following a present time is defined in the content comprising a plurality of packets, based on a counter value showing play timing information contained in the packets, the content is split into the defined number of the packets, and the defined number of the packets is transferred to maintain transmission rate using the processing path.

4. A content management apparatus including a network interface for communicating with another apparatus through a network, a storage device for storing a plurality of contents, and selection information defining relationship among content types, digital rights management information, and contents transfer methods to determine how to transfer a content, the content management apparatus comprising:

a processing collaborator, implemented by executing a program stored in a memory device in the content management apparatus, for receiving a content request from the another apparatus through the network;

a content management portion, implemented by executing a program stored in the memory device in the content management apparatus, wherein the content management portion:

copies control information of a content designated by the content request, determines whether or not the content can be used by the another apparatus in accordance with at least one of digital right management information and intended use for the designated content, when the content can be used by another apparatus, determines whether or not the content can be accessed through a network, when the content can be accessed through the network, determines whether transfer of the content is not being performed and whether use of the content is not prohibited, and when the transfer of the content is not being performed and the use of the content is not prohibited, selects a file transfer method if the content does not have the digital right management information, or a streaming transfer method if the content has the digital right management information, the file transfer method being a method of burst-transferring a content, the streaming transfer method being a method of performing a real time content transferring process, and in response to the selection of the first transfer method and the streaming transfer method performed by the content management portion, notifies the another apparatus that the selection of one of the file transfer method and the streaming transfer method has been made; and a digital rights management portion, implemented by executing a program stored in the memory device in the content management apparatus, for establishing an encryption communication path between the content management apparatus and the another apparatus, wherein the content management portion reads the content from the storage device and transfers the read content to the another apparatus.

5. The content management apparatus according to claim 4, further comprising a streaming processing portion, operable in response to the streaming transfer method, for dividing the content to be transferred into a plurality of packets in accordance with an amount of a counter value as play timing information included in the content.

* * * * *